2566X
E. Hotchkiss,
Thrashing Mach.
Patented Apr. 8. 1816.
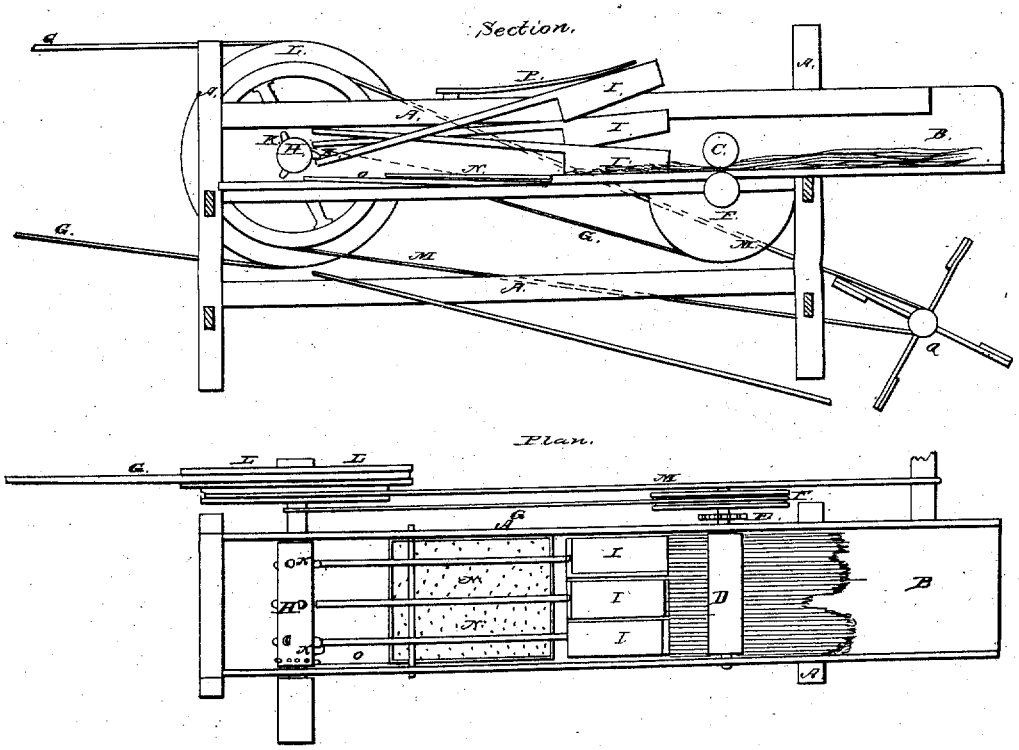

Apl 8 1816 [illegible]  25[illegible]X

Elihu Hotchkiss
Letters Patent.

The Schedule referred to in these Letters Patent and making part of the same
containing a description in the words of the said Elihu Hotchkiss himself
of his Threshing and Fanning Machine.

The frame of this machine is composed of scantling or slit work, the posts
are 4 by 4 inches square, and five feet long. the plates and girths are 3
by 4. the frame is 4 feet 4 inches high from the ground to the top of the
plates, and 23 inches wide within the posts. the plates are framed into the
posts 8 inches below the top in front. and project over the hinder end
18 inches to support the straw Box. the upper girts are placed 12 inches
below the top of the plates on the sides; the end girths one inch below the side
ones. to admit the floor of the straw Box. the lower end girths are framed
into the posts 10 inches above the foot of the posts, and the lower side girths
directly above them; directly under the middle side girths, 12 inches from
the back posts is placed the lower, or bed cylinder, and is confined in
a box at each end for the gudgeon to turn in. the upper cylinder in the
same direction crosswise of the Box and exactly over the first turning in
boxes cut thro' the sides of the straw Box, this cylinder is made to rise or
sink and preserve a proper bearing or pressure according to the quantity of
straw spread in the box. by springs placed over the gudgeons and made fast
at one end to the underside of the plates. On one end of both cylinders
outside of the straw Box. are fixed iron cog wheels containing 10 spur
cogs. each two inches in length out of the rim of the wheels which are 4
inches diameter. Each cylinder within the straw Box is 6 inches diame-
ter. The upper cylinder is put in motion by the under one, and this by
the operation of a wooden wheel 2 feet in diameter confined on the
gudgeon outside of the before mentioned iron wheel. over the wooden wheel
a band is passed. and crosses itself in its passage to the neck or barrel
of the main shaft which gives motion to the threshing Hammers. The
neck or barrel of the said Shaft between the frame and balance wheel
are fluted down to 3/2 inches to receive the band. This shaft or barrel 8 2566X is 4 feet long and 6 inches in diameter. has its position crosswise at the
fore end of the machine. in the centre of this shaft each way from the plates
are inserted 3 setts of Kams of 3 Kams in a sett, placed at proper dis-
tances to operate upon the hafts of the hammers whose motion is similar
to a black smiths trip Hammer. On the farther end of this shaft is fix-
ed a balance wheel 26 inches in diameter constructed with four arms
and fellies. 6 inches thick and 8 wide. the outer surface is divided &
fluted to receive two bands. one convex larger than the other & on the
outside gives the first motion. and is adapted to either horse or water
Power. The lesser or inside convex receives a band passing over it to a
wheel about 3 inches in diameter on the end of the fanning mill shaft
the Box extends 2 1/2 feet beyond the hind end of the frame over the
Fanning Mill. which is constructed like a common dutch winnowing
mill. Directly in front of the 2 cylinders is placed three wooden
Hammers or mallets of an exact thickness and just sufficient to fill up
the Straw Box 4 1/2 inches wide and 17 inches long with hafts or handles 3 1/2
feet long. the hafts are hung at 10 inches from the fore end upon a gudgeon to
receive the Kams which give them motion like the trip Hammer.
Directly in front of the Hammers is a riddle screen or sieve made of sheet
iron. over which the Straw passes after the operation of the hammers and
through which the grain is sifted into the fanning mill a quick movement
is given to the screen or seive up and down by means of a lever hung on
a pivot near the centre thereof. and this lever obtains its motion from
the operation of 12 small cogs inserted in the further end of the Barrel
shaft & inside of the straw Box. Over each hammer is fixed a
check spring like a Rabit to a forgemans Hammer. It is not conceiv
-ed necessary to describe that part of the machine which composes the
fanning mill. those mills being so commonly in use thro' our country
that almost all persons must have a knowledge of them.

Exd. Witnesses
4/6. Stephen Greenleaf Elihu Hotchkiss
Sam Elliot